US012290092B2

(12) United States Patent
Mironov

(10) Patent No.: US 12,290,092 B2
(45) Date of Patent: May 6, 2025

(54) AEROSOL-FORMING SUBSTRATE AND AEROSOL-DELIVERY SYSTEM

(71) Applicant: PHILIP MORRIS PRODUCTS S.A.A, Neuchatel (CH)

(72) Inventor: Oleg Mironov, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 0 days.

(21) Appl. No.: 18/511,113

(22) Filed: Nov. 16, 2023

(65) Prior Publication Data

US 2024/0081387 A1 Mar. 14, 2024

Related U.S. Application Data

(63) Continuation of application No. 17/202,934, filed on Mar. 16, 2021, now Pat. No. 11,849,754, which is a (Continued)

(30) Foreign Application Priority Data

May 21, 2014 (EP) .................................... 14169194

(51) Int. Cl.
*A24B 15/12* (2006.01)
*A24D 1/20* (2020.01)
(Continued)

(52) U.S. Cl.
CPC ................ *A24B 15/12* (2013.01); *A24D 1/20* (2020.01); *A24F 40/465* (2020.01); *A24F 40/53* (2020.01);
(Continued)

(58) Field of Classification Search
None
See application file for complete search history.

(56) References Cited

U.S. PATENT DOCUMENTS 4,256,945 A 3/1981 Carter
5,269,327 A 12/1993 Counts
(Continued)

FOREIGN PATENT DOCUMENTS

EP 2253233 11/2010
EP 2444112 4/2012
(Continued)

OTHER PUBLICATIONS

PCT Search Report and Written Opinion for PCT/EP2015/061217 dated Sep. 10, 2015 (9 pages).
(Continued)

*Primary Examiner* — Phu H Nguyen
(74) *Attorney, Agent, or Firm* — Mueting Raasch Group

(57) ABSTRACT

There is described an aerosol-forming substrate for use in combination with an inductive heating device. The aerosol-forming substrate comprises a solid material capable of releasing volatile compounds that can form an aerosol upon heating of the aerosol-forming substrate and at least a first susceptor material for heating of the aerosol-forming substrate. The first susceptor material is arranged in thermal proximity of the solid material. The aerosol-forming substrate further comprises at least a second susceptor material having a second Curie-temperature which is lower than a predefined maximum heating temperature of the first susceptor material. There is also described an aerosol-delivery system.

19 Claims, 2 Drawing Sheets

Related U.S. Application Data continuation of application No. 15/121,565, filed as application No. PCT/EP2015/061219 on May 21, 2015, now Pat. No. 10,952,469.

(51) Int. Cl.

| | |
|---|---|
| ***A24F 40/465*** | (2020.01) |
| ***A24F 40/53*** | (2020.01) |
| ***H05B 6/06*** | (2006.01) |
| ***H05B 6/10*** | (2006.01) |
| *A24F 40/20* | (2020.01) |
| *A24F 40/60* | (2020.01) |

(52) U.S. Cl.

CPC ............... *H05B 6/06* (2013.01); *H05B 6/108* (2013.01); *A24F 40/20* (2020.01); *A24F 40/60* (2020.01); *H05B 2206/023* (2013.01)

(56) References Cited

U.S. PATENT DOCUMENTS

| | | | |
|---|---|---|---|
| 5,613,505 | A | 3/1997 | Campbell |
| 5,911,898 | A | 6/1999 | Jacobs |
| 6,681,998 | B2 | 1/2004 | Sharpe |
| 2002/0113066 | A1 | 8/2002 | Stark |
| 2008/0006796 | A1 | 1/2008 | Khatua |
| 2011/0290269 | A1 | 12/2011 | Shimizu |
| 2013/0042865 | A1 | 2/2013 | Monsees |

FOREIGN PATENT DOCUMENTS

| | | |
|---|---|---|
| KR | 2014-0116381 | 10/2014 |
| WO | WO 95/27411 | 10/1995 |

OTHER PUBLICATIONS

PCT Search Report and Written Opinion for PCT/EP2015/061218 dated Sep. 8, 2015 (9 pages).

Office Action issued in India for Application No. 2016/17023691 dated Mar. 20, 2020 (6 pages). English translation included.

PCT Search Report and Written Opinion for PCT/EP2015/061219 dated Sep. 8, 2015 (11 pages).

AEROSOL-FORMING SUBSTRATE AND AEROSOL-DELIVERY SYSTEM

This application is a continuation of U.S. application Ser. No. 17/202,934, filed Mar. 16, 2021 and which is a U.S. application Ser. No. 15/121,565, filed Aug. 25, 2016, now U.S. Pat. No. 10,952,469, and which is a U.S. National Stage Application of International Application No. PCT/EP2015/061219, filed May 21, 2015, which was published in English on Nov. 26, 2015, as International Patent Publication WO 2015/177265 A1. International Application No. PCT/EP2015/061219 claims priority to European Application No. 14169194.9 filed May 21, 2014.

The present invention relates to an aerosol-forming substrate for use in combination with an inductive heating device. The invention also relates to an aerosol-delivery system.

From the prior art aerosol-delivery systems are known, which comprise an aerosol-forming substrate and an inductive heating device. The inductive heating device comprises an induction source which produces an alternating electromagnetic field which induces a heat generating eddy current in a susceptor material. The susceptor material is in thermal proximity of the aerosol-forming substrate. The heated susceptor material in turn heats the aerosol-forming substrate which comprises a material which is capable of releasing volatile compounds that can form an aerosol. A number of embodiments of aerosol-forming substrates have been described in the art which supposedly ascertain an adequate heating of the aerosol-forming substrate.

It would therefore be desirable to ensure that only matched aerosol-forming substrates may be used in combination with a specific inductive heating device.

According to one aspect of the invention an aerosol-forming substrate for use in combination with an inductive heating device is provided. The aerosol-forming substrate comprises a solid material capable of releasing volatile compounds that can form an aerosol upon heating of the aerosol-forming substrate and at least a first susceptor material for the heating of the aerosol-forming substrate. The first susceptor material is arranged in thermal proximity of the solid material. The aerosol-forming substrate further comprises at least a second susceptor material having a second Curie-temperature which is lower than a predefined maximum heating temperature of the first susceptor material.

The predefined maximum heating temperature of the first susceptor material may be a first Curie-temperature thereof. When the first susceptor material is heated and reaches its first Curie-temperature its magnetic properties reversibly change from a ferromagnetic phase to a paramagnetic phase. This phase change may be detected and the inductive heating be stopped. Due to the stopped heating the first susceptor material cools down again to a temperature where its magnetic properties change from a paramagnetic phase to a ferromagnetic phase. This phase change may be detected and the inductive heating may be started again. Alternatively the maximum heating temperature of the first susceptor material may correspond to a predefined temperature which may be controlled electronically. The first Curie-temperature of the first susceptor material in that case may be higher than the maximum heating temperature.

While the first susceptor material provides for an adequate heating of the aerosol-forming substrate in order for the solid material to release volatile compounds that can form an aerosol, the second susceptor material may be used for identification of a matched aerosol-forming substrate. The second susceptor material has a second Curie-temperature which is lower than the maximum heating temperature of the first susceptor material. Upon heating of the aerosol-forming substrate the second susceptor material reaches its second Curie-temperature before the first susceptor material arrives at its maximum heating temperature. When the second susceptor material reaches its second Curie-temperature its magnetic properties change reversibly from a ferromagnetic phase to a paramagnetic phase. As a consequence hysteresis losses of the second susceptor material disappear. This change of the magnetic properties of the second susceptor material may be detected by an electronic circuitry which may be integrated into the inductive heating device. Detection of the change of magnetic properties may be accomplished, e.g., by quantitatively measuring a change in the oscillation frequency of an oscillation circuit connected with an induction coil of the inductive heating device, or, e.g., by qualitatively determining if a change in the oscillation frequency or the induction current has occurred within a specified time slot from activating the induction heating device. If an expected quantitative or qualitative change in an observed physical quantity is detected the inductive heating of the aerosol-forming substrate may be continued until the first susceptor material reaches its maximum heating temperature, in order to produce the desired amount of aerosol. If the expected quantitative or qualitative change of the observed physical quantity does not occur, the aerosol-forming substrate may be identified as non-original, and the inductive heating may be stopped.

The aerosol-forming substrate according to the invention allows an identification of non-original products, which may cause problems when used in combination with a specific inductive heating device. Thus, adverse effects to the inductive heating device may be avoided. Also, by detecting non-original aerosol-forming substrates a production and delivery of non-specified aerosols to a customer may be precluded.

The aerosol-forming substrate is preferably a solid material capable of releasing volatile compounds that can form an aerosol. The term solid as used herein encompasses solid materials, semi-solid materials, and even liquid components, which may be provided on a carrier material. The volatile compounds are released by heating the aerosol-forming substrate. The aerosol-forming substrate may comprise nicotine. The nicotine containing aerosol-forming substrate may be a nicotine salt matrix. The aerosol-forming substrate may comprise plant-based material. The aerosol-forming substrate may comprise tobacco, and preferably the tobacco containing material contains volatile tobacco flavour compounds, which are released from the aerosol-forming substrate upon heating. The aerosol-forming substrate may comprise homogenised tobacco material. Homogenised tobacco material may be formed by agglomerating particulate tobacco. The aerosol-forming substrate may alternatively comprise a non-tobacco-containing material. The aerosol-forming substrate may comprise homogenised plant-based material.

The aerosol-forming substrate may comprise at least one aerosol-former. The aerosol-former may be any suitable known compound or mixture of compounds that, in use, facilitates formation of a dense and stable aerosol and that is substantially resistant to thermal degradation at the operating temperature of the inductive heating device. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Particularly preferred aerosol formers are polyhydric alcohols or mixtures thereof, such as triethylene glycol, 1,3-butanediol and, most preferred, glycerine.

The aerosol-forming substrate may comprise other additives and ingredients, such as flavourants. The aerosol-forming substrate preferably comprises nicotine and at least one aerosol-former. In a particularly preferred embodiment, the aerosol-former is glycerine. The susceptor materials being in thermal proximity of the aerosol-forming substrate allow for a more efficient heating and thus, higher operating temperatures may be reached. The higher operating temperature enables glycerine to be used as an aerosol-former which provides an improved aerosol as compared to the aerosol-formers used in the known systems.

In another embodiment of the invention the aerosol-forming substrate further comprises at least a third susceptor material having a third Curie-temperature. The third Curie-temperature of the third susceptor material and the second Curie-temperature of the second susceptor material are distinct from one other and lower than the maximum heating temperature of the first susceptor material. By furnishing the aerosol-forming substrate with a second and a third susceptor material having first and second Curie-temperatures which are lower than the maximum heating temperature of the first susceptor material, an even more accurate identification of the aerosol-forming substrate may be afforded. The inductive heating device may be equipped with a corresponding electronic circuitry which is capable of detecting two expected consecutive quantitative or qualitative changes of an observed physical quantity. If the electronic circuitry detects the expected two consecutive quantitative or qualitative changes of the observed physical quantity, the inductive heating of the aerosol-forming substrate and thus the aerosol production may be continued. If the expected two consecutive quantitative or qualitative changes of the observed physical quantity are not detected, the inserted aerosol-forming substrate may be identified as non-original and the inductive heating of the aerosol-forming substrate may be stopped.

In an embodiment of the aerosol-forming substrate which comprises second and third susceptor materials, the second Curie-temperature of the second susceptor material may be at least 20° C. lower than the third Curie-temperature of the third susceptor material. This difference in Curie-temperatures of the second and third susceptor materials may facilitate the detection of changes of the magnetic properties of the second and third susceptor materials, respectively, when they reach their respective second and third Curie-temperatures.

In another embodiment of the aerosol-forming substrate the second Curie-temperature of the second susceptor material amounts to 15% to 40% of the maximum heating temperature of the first susceptor material. The second Curie-temperature of the second susceptor material being rather low, the identification process may be performed at an early stage of the inductive heating of the aerosol-forming substrate. Thereby energy may be saved, in case that a non-original aerosol-forming substrate is identified.

In a further embodiment of the aerosol-forming substrate according to the invention the maximum heating temperature of the first susceptor material may be selected such, that upon being inductively heated an overall average temperature of the aerosol-forming substrate does not exceed 240° C. The overall average temperature of the aerosol-forming substrate here is defined as the arithmetic mean of a number of temperature measurements in central regions and in peripheral regions of the aerosol-forming substrate. By pre-defining a maximum for the overall average temperature the aerosol-forming substrate may be tailored to an optimum production of aerosol.

In another embodiment of the aerosol-forming substrate the maximum heating temperature of the first susceptor material is selected such that is does not exceed 370° C., in order to avoid a local overheating of the aerosol-forming substrate comprising the solid material which is capable of releasing volatile compounds that can form an aerosol. It should be noted that the maximum heating temperature of the first susceptor material need not necessarily correspond with its first Curie-temperature. If the maximum heating temperature of the first susceptor material may be controlled, e.g., electronically, the first Curie-temperature of the first susceptor material may be higher than the maximum heating temperature thereof.

The primary function of the second susceptor material and optionally the third susceptor material is to allow for an identification of matched aerosol-forming substrates. The main heat deposition is carried out by the first susceptor material. Therefore, in an embodiment of the aerosol-forming substrate the second and third susceptor materials each may have a concentration by weight which is lower than a concentration by weight of the first susceptor material. Thus, the amount of first susceptor material within the aerosol-forming material may be kept high enough, to ensure a proper heating and production of aerosol.

The first susceptor material, the second susceptor material and optionally the third susceptor material, respectively, may be one of a particulate, or a filament, or a mesh-like configuration. Different geometrical configurations of the first, the second and optionally the third susceptor materials may be combined with each other, thereby enhancing the flexibility with regard to an arrangement of the susceptor materials within the aerosol-forming substrate, in order to optimize heat deposition and the identification function, respectively. By having different geometrical configurations the first susceptor material, the second and optionally the third susceptor material may be tailored to their specific tasks, and they may be arranged within the aerosol-forming substrate in a specific manner for an optimization of the aerosol production and the identification function, respectively.

In a still further embodiment of the aerosol-forming substrate the second and optionally the third susceptor material may be arranged in peripheral regions of the aerosol-forming substrate. Being arranged in peripheral regions during the inductive heating of the aerosol-forming substrate the induction field may reach the second and optionally the third susceptor material practically unimpeded, thus resulting in a very fast response of the second and optionally the third susceptor materials.

In another embodiment the aerosol-forming substrate may be attached to a mouthpiece, which optionally comprises a filter plug. The aerosol-forming substrate and the mouthpiece form a structural entity. Every time a new aerosol-forming substrate is used for aerosol generation, the user is automatically provided with a new mouthpiece. This may be appreciated in particular from a hygienic point of view. Optionally the mouthpiece may be provided with a filter plug, which may be selected in accordance with a specific composition of the aerosol-forming substrate.

In yet another embodiment of the invention the aerosol-forming substrate may be of a generally cylindrical shape and be enclosed by a tubular casing, such as, e.g., an overwrap. The tubular casing, such as, e.g. the overwrap, may help to stabilize the shape of the aerosol-forming substrate and to prevent an accidental disassociation of the solid material which is capable of releasing volatile compounds that can form an aerosol, and the first, and second and optionally the third susceptor materials.

An aerosol-delivery system according to the invention comprises an inductive heating device and an aerosol-forming substrate according to any one of the described embodiments. Such an aerosol-delivery system allows for a reliable identification of the aerosol-forming substrate. Non-original products, which might cause problems when used in combination with a specific induction heating device may be identified and rejected by the induction heating device. Thus, adverse effects to the induction heating device may be avoided. Also, by detecting non-original aerosol-forming substrates a production and delivery of non-specified aerosols to a customer may be precluded.

In an embodiment of the aerosol-delivery system the inductive heating device may be provided with an electronic control circuitry, which is adapted for a detection of the second and optionally the third susceptor materials having reached their respective second and third Curie-temperatures. Upon reaching their second and third Curie-temperatures the magnetic properties of the second and optionally third susceptor materials change reversibly from a ferromagnetic phase to a paramagnetic phase. As a consequence hysteresis losses of the second and optionally the third susceptor material disappear. This change of the magnetic properties of the second and optionally the third susceptor material may be detected by the electronic circuitry which may be integrated in the induction heating device. Detection may be accomplished, e.g., by quantitatively measuring a change in the oscillation frequency of an oscillation circuitry connected with an induction coil of the induction heating device, or, e.g., by qualitatively determining if a change in the oscillation frequency or the induction current has occurred within a specified time slot from activating the induction heating device. In case that the aerosol-forming substrate comprises second and third susceptor materials two expected consecutive quantitative or qualitative changes of an observed physical quantity must be detected. If the expected quantitative or qualitative change of the observed physical quantity is detected, the inductive heating of the aerosol-forming substrate may be continued in order to produce the desired amount of aerosol. If the expected change of the observed physical quantity is not detected, the aerosol-forming substrate may be identified as non-original, and the inductive heating thereof may be stopped.

In a further embodiment of the aerosol-delivery system the inductive heating device may be provided with an indicator, which may be activatable upon detection of the second and optionally the third susceptor materials having reached their second and third Curie-temperatures. The indicator may e.g. be an acoustical or an optical indicator. In one embodiment of the aerosol-delivery system the optical indicator is a LED, which may be provided on a housing of the induction heating device. Thus, if a non-original aerosol-forming substrate is detected, e.g. a red light may indicate the non-original product.

The afore-described embodiments of the aerosol-forming substrate and of the aerosol-delivery system will become more apparent from the following detailed description, reference being made to the accompanying schematic drawings which are not to scale, in which.

Inductive heating is a known phenomenon described by Faraday's law of induction and Ohm's law. More specifically, Faraday's law of induction states that if the magnetic induction in a conductor is changing, a changing electric field is produced in the conductor. Since this electric field is produced in a conductor, a current, known as an eddy current, will flow in the conductor according to Ohm's law. The eddy current will generate heat proportional to the current density and the conductor resistivity. A conductor which is capable of being inductively heated is known as a susceptor material. The present invention employs an inductive heating device equipped with an inductive heating source, such as, e.g., an induction coil, which is capable of generating an alternating electromagnetic field from an AC source such as an LC circuit. Heat generating eddy currents are produced in the susceptor material which is in thermal proximity to a solid material which is capable of releasing volatile compounds that can form an aerosol upon heating of the aerosol-forming substrate and which is comprised in an aerosol-forming substrate. The term solid as used herein encompasses solid materials, semi-solid materials, and even liquid components, which may be provided on a carrier material. The primary heat transfer mechanisms from the susceptor material to the solid material are conduction, radiation and possibly convection.

Figure 1:
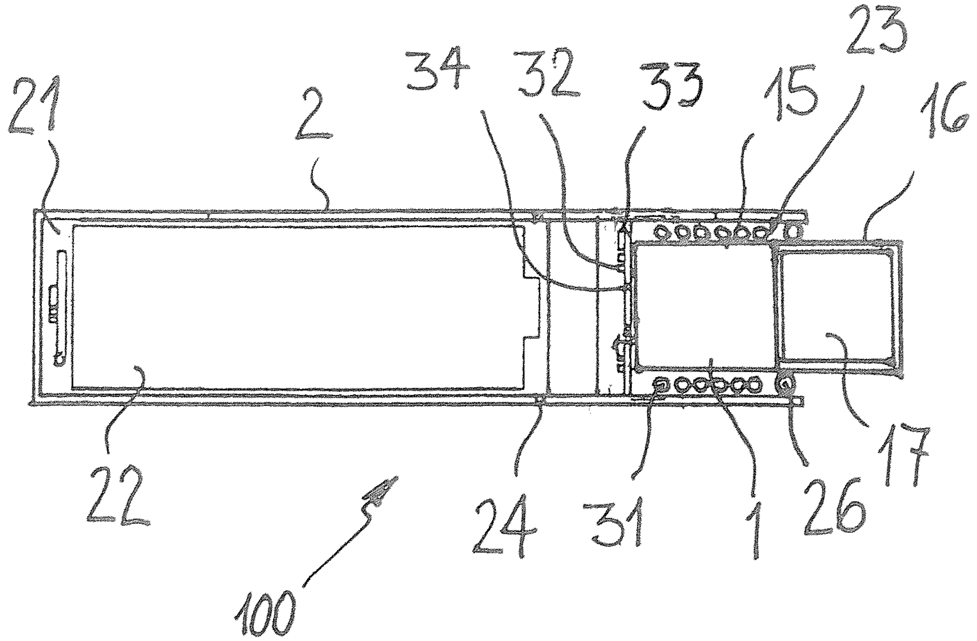
FIG. 1 shows an aerosol-delivery system comprising an inductive heating device and an aerosol-forming substrate inserted into the device.

In schematic FIG. 1 an exemplary embodiment of an aerosol-delivery system according to the invention is generally designated with reference numeral 100. The aerosol-delivery system 100 comprises an inductive heating device 2 and an aerosol-forming substrate 1 associated therewith. The inductive heating device 2 may comprise an elongated tubular housing 20 having an accumulator chamber 21 for accommodating an accumulator 22 or a battery, and a heating chamber 23. The heating chamber 23 may be provided with an inductive heating source, which, as shown in the depicted exemplary embodiment, may be constituted by an induction coil 31 which is electrically connected with an electronic circuitry 32. The electronic circuitry 32 may e.g. be provided on a printed circuit board 33 which delimits an axial extension of the heating chamber 23. The electric power required for the inductive heating is provided by the accumulator 22 or the battery which is accommodated in the accumulator chamber 21 and which is electrically connected with the electronic circuitry 32. The heating chamber 23 has an internal cross-section such that the aerosol-forming substrate 1 may be releasably held therein and may easily be removed and replaced with another aerosol-forming substrate 1 when desired.

The aerosol-forming substrate 1 may be of a generally cylindrical shape and may be enclosed by a tubular casing 15, such as, e.g., an overwrap. The tubular casing 15, such as, e.g. the overwrap, may help to stabilize the shape of the aerosol-forming substrate 1 and to prevent an accidental loss of the contents of the aerosol-forming substrate 1. As shown in the exemplary embodiment of the aerosol-delivery system 100 according to FIG. 1, the aerosol-forming substrate 1 may be connected to a mouthpiece 16, which, with the aerosol-forming substrate 1 having been inserted into the heating chamber 23, at least partly protrudes from the heating chamber 23. The mouthpiece 16 may comprise a filter plug 17 filter plug, which may be selected in accordance with the composition of the aerosol-forming substrate 1. The aerosol-forming substrate 1 and the mouthpiece 16 may be assembled to form a structural entity. Every time a new aerosol-forming substrate 1 is to be used in combination with the inductive heating device 2, the user is automatically provided with a new mouthpiece 16, which might be appreciated from a hygienic point of view.

As shown exemplarily in FIG. 1 the induction coil 31 may be arranged in a peripheral region of the heating chamber 23, in vicinity of the housing 20 of the inductive heating device 2. The windings of the induction coil 31 enclose a free space of the heating chamber 23 which is capable to accommodate the aerosol-forming substrate 1. The aerosol-forming substrate 1 may be inserted into this free space of the heating chamber 23 from an open end of the tubular housing 20 of the inductive heating device 2 until it reaches a stop, which may be provided inside the heating chamber 23. The stop may be constituted by at least one lug protruding from an inside wall of the tubular housing 20, or it may be constituted by the printed circuit board 33, which delimits the heating chamber 23 axially, as it is shown in FIG. 1. The inserted aerosol-forming substrate 1 may be releasably held within the heating chamber 23 e.g. by an annular sealing gasket 26, which may be provided in vicinity of the open end of the tubular housing 20. The tubular housing 20 of the inductive heating device 2 may be equipped with an indicator (not shown in FIG. 1), preferably an LED, which may be controlled by the electronic circuitry 32 and which is capable of indicating specific states of the aerosol-delivery system 100.

The aerosol-forming substrate 1 and the optional mouthpiece 16 with the optional filter plug 17 are pervious to air. The inductive heating device 2 may comprise a number of vents 24, which may be distributed along the tubular housing 20. Air passages 34 which may be provided in the printed circuit board 33 enable airflow from the vents 24 to the aerosol-forming substrate 1. It should be noted, that in alternative embodiments of the inductive heating device 2 the printed circuit board 33 may be omitted such that air from the vents 24 in the tubular housing 20 may reach the aerosol-forming substrate 1 practically unimpeded. The inductive heating device 2 may be equipped with an air flow sensor (not shown in FIG. 1) for activation of the electronic circuitry 32 and the induction coil 31 when incoming air is detected. The air flow sensor may e.g. be provided in vicinity of one of the vents 24 or of one of the air passages 34 of the printed circuit board 33. Thus, a user may suck at the mouthpiece 16, in order to initiate the inductive heating of the aerosol-forming substrate 1 Upon heating an aerosol, which is released by the solid material comprised in the aerosol-forming substrate 1, may be inhaled together with air which is sucked through the aerosol-forming substrate 1.

Figure 2:
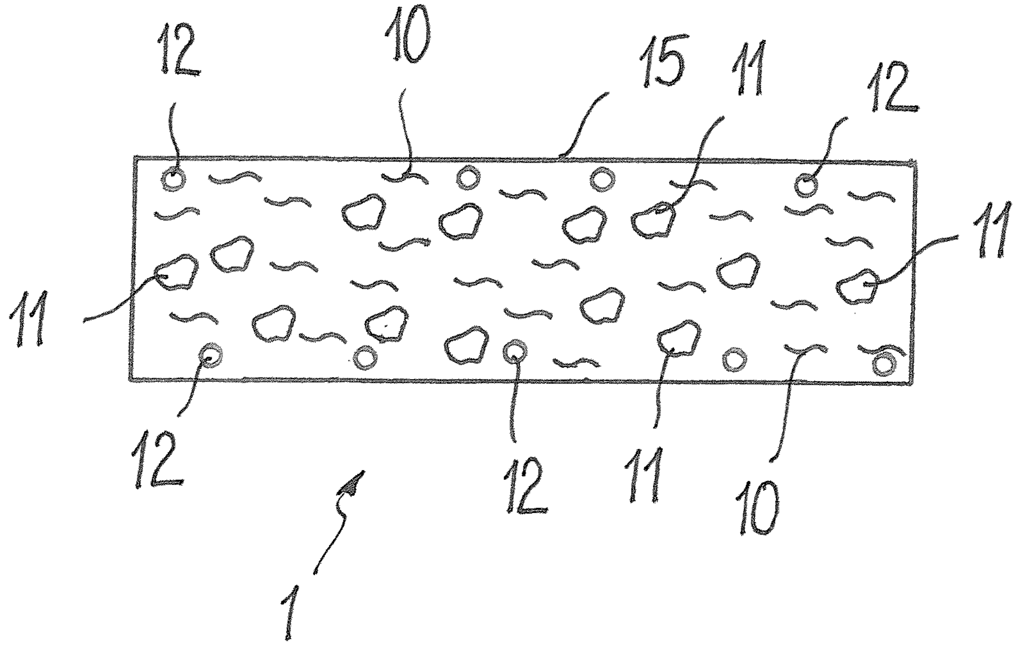
FIG. 2 shows a first embodiment of an aerosol-forming substrate comprising a first susceptor material of particulate configuration and a second susceptor material of particulate configuration.

FIG. 2 schematically shows a first embodiment of an aerosol-forming substrate which is generally designated with reference numeral 1. The aerosol-forming substrate 1 may comprise a generally tubular casing 15, such as, e.g., an overwrap. The tubular casing 15 may be made of a material which does not noticeably impede an electromagnetic field reaching the contents of the aerosol-forming substrate 1. E.g. the tubular casing 15 may be a paper overwrap. Paper has a high magnetic permeability and in an alternating electromagnetic field is not heated by eddy currents. The aerosol-forming substrate 1 comprises a solid material 10 which is capable of releasing volatile compounds that can form an aerosol upon heating of the aerosol-forming substrate 1 and at least a first susceptor material 11 for heating the aerosol-forming substrate 1 which is arranged in thermal proximity of the solid material 10. The term solid as used herein encompasses solid materials, semi-solid materials, and even liquid components, which may be provided on a carrier material. The aerosol-forming substrate 1 further comprises at least a second susceptor material 12 having a second Curie-temperature. The second Curie-temperature of the second susceptor material 12 is lower than a predefined maximum heating temperature of the first susceptor material 11.

The predefined maximum heating temperature of the first susceptor material 11 may be a first Curie-temperature thereof. When the first susceptor material 11 is heated and reaches its first Curie-temperature its magnetic properties reversibly change from a ferromagnetic phase to a paramagnetic phase. This phase change may be detected and the inductive heating be stopped. Due to the discontinued heating the first susceptor material 11 cools down again to a temperature where its magnetic properties change from a paramagnetic phase to a ferromagnetic phase. This phase change may also be detected and the inductive heating of the aerosol-forming substrate 1 may be activated again. Alternatively the predefined maximum heating temperature of the first susceptor material 11 may correspond to a predefined temperature which may be controlled electronically. The first Curie-temperature of the first susceptor material 11 in that case may be higher than the predefined maximum heating temperature.

The first susceptor material 11 may be optimized with regard to heat loss and thus heating efficiency. Thus, the first susceptor material 11 should have a low magnetic reluctance and a correspondingly high relative permeability to optimize surface eddy currents generated by an alternating electromagnetic field of a given strength. The first susceptor material 11 should also have relatively low electrical resistivity in order to increase Joule heat dissipation and thus heat loss.

While the first susceptor material 11 provides for an adequate heating of the aerosol-forming substrate 1 in order for the solid material to release volatile compounds that can form an aerosol, the second susceptor material 12 may be used for identification of a matched aerosol-forming substrate 1. A matched aerosol-forming substrate, as used herein, is an aerosol-forming substrate 1 of a clearly defined composition, which has been optimized for use in combination with a specific inductive heating device. Thus, the concentrations by weight of the solid material 10, and the at least first and second susceptor materials 11, 12, their specific formulations and configurations, their arrangement within the aerosol-forming substrate 1, as well as the response of the first susceptor material 11 to an induction field and the aerosol production as a result of the heating of the solid material 10 have been tailored with regard to a specific induction heating device. The second susceptor material 12 has a second Curie-temperature which is lower than the maximum heating temperature of the first susceptor material 11. Upon heating of the aerosol-forming substrate 1 the second susceptor material 12 reaches its second Curie-temperature before the first susceptor material arrives at its maximum heating temperature. When the second susceptor material 12 reaches its second Curie-temperature its magnetic properties change reversibly from a ferromagnetic phase to a paramagnetic phase. As a consequence hysteresis losses of the second susceptor material 12 disappear. This change of the magnetic properties of the second susceptor material 12 may be detected by an electronic circuitry which may be integrated into the inductive heating device. Detection of the change of magnetic properties may be accomplished, e.g., by quantitatively measuring a change in the oscillation frequency of an oscillation circuit connected with an induction coil of the inductive heating device, or, e.g., by qualitatively determining if a change e.g. of the oscillation frequency or the induction current has occurred within a specified time slot from activating the induction heating device. If an expected quantitative or qualitative change in an observed physical quantity is detected the inductive heating of the aerosol-forming substrate may be continued until the first susceptor material 11 reaches its maximum heating temperature, in order to produce the desired amount of aerosol. If the expected quantitative or qualitative change of the observed physical quantity does not occur, the aerosol-forming substrate 1 may be identified as non-original, and the inductive heating thereof may be stopped. Because the second susceptor material 12 usually does not contribute to the heating of the aerosol-forming substrate 1 its concentration by weight may be lower than a concentration by weight of the first susceptor material 11.

The maximum heating temperature of the first susceptor material 11 may be selected such that upon being inductively heated an overall average temperature of the aerosol-forming substrate 1 does not exceed 240° C. The overall average temperature of the aerosol-forming substrate 1 here is defined as the arithmetic mean of a number of temperature measurements in central regions and in peripheral regions of the aerosol-forming substrate. In another embodiment of the aerosol-forming substrate 1 the maximum heating temperature of the first susceptor material 11 may be selected such that is does not exceed 370° C., in order to avoid a local overheating of the aerosol-forming substrate 1 comprising the solid material 10 which is capable of releasing volatile compounds that can form an aerosol.

The afore-described basic composition of the aerosol-forming substrate 1 of the exemplary embodiment of FIG. 2 is shared by all further embodiments of the aerosol-forming substrate 1 which will be described hereinafter.

From FIG. 2 it may also be recognized that the aerosol-forming substrate 1 comprises first and second susceptor materials 11, 12, which, both, may be of particulate configuration. The first and second susceptor materials 11, 12 may preferably have an equivalent spherical diameter of 10 μm-100 μm. The equivalent spherical diameter is used in combination with particles of irregular shape and is defined as the diameter of a sphere of equivalent volume. At the selected sizes the particulate first and second susceptor materials 11, 12 may be distributed throughout the aerosol-forming substrate 1 as required and they may be securely retained within aerosol-forming substrate 1. As shown in FIG. 2 the first susceptor material 11 may be distributed throughout the solid material 10 about homogeneously. The second susceptor material 12 may be arranged preferably in peripheral regions of the aerosol-forming substrate 1.

The second Curie-temperature of the second susceptor material 12 may amount to 15% to 40% of the maximum heating temperature of the first susceptor material 11. The second Curie-temperature of the second susceptor material 12 being rather low, the identification process may be performed at an early stage of the inductive heating of the aerosol-forming substrate 1. Thereby energy may be saved, in case that a non-original aerosol-forming substrate 1 is identified.

Figure 3:
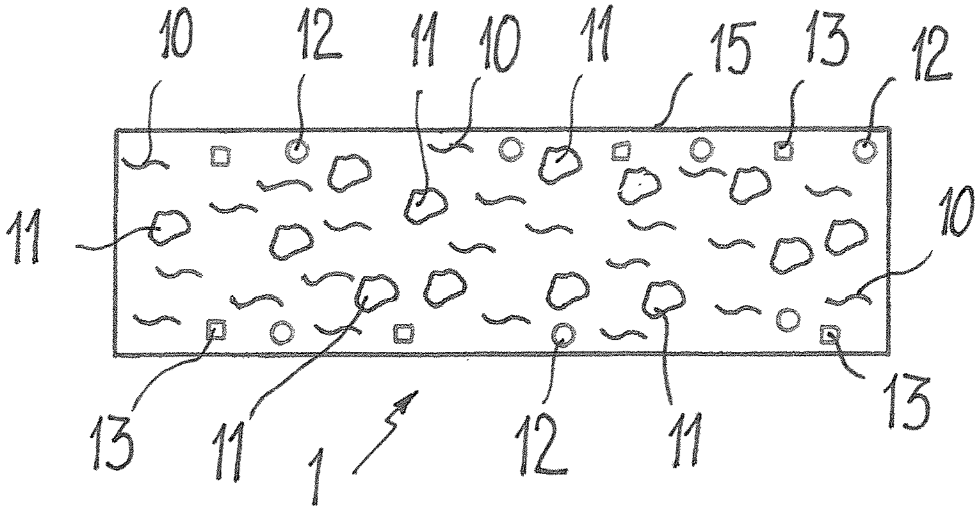
FIG. 3 shows a second embodiment of the aerosol-forming substrate comprising a first susceptor material of particulate configuration and second and third susceptor materials of particulate configuration.

FIG. 3 shows another embodiment of an aerosol-forming substrate, which is generally designated with reference numeral 1. The aerosol-forming substrate 1 may be of a generally cylindrical shape and may be enclosed by a tubular casing 15, such as, e.g., an overwrap. The aerosol-forming substrate 1 comprises solid material 10 which is capable of releasing volatile compounds that can form an aerosol upon heating of the aerosol-forming substrate 1 and at least first and second susceptor materials 11, 12. The first and second susceptor materials 11, 12, both, may be of particulate configuration again. The embodiment of the aerosol-forming substrate 1 shown in FIG. 3 further comprises at least a third susceptor material 13 having a third Curie-temperature. The third Curie-temperature of the third susceptor material 13 and the second Curie-temperature of the second susceptor material 12 are distinct from one other and lower than the maximum heating temperature of the first susceptor material 11. By furnishing the aerosol-forming substrate with second and a third susceptor materials 12, 13 having first and second Curie-temperatures which are lower than the maximum heating temperature of the first susceptor material 11, an even more accurate identification of the aerosol-forming substrate may be afforded. The inductive heating device may be equipped with a corresponding electronic circuitry which is capable of detecting two expected consecutive quantitative or qualitative changes of an observed physical quantity. If the electronic circuitry detects the expected two consecutive quantitative or qualitative changes of the observed physical quantity, the inductive heating of the aerosol-forming substrate 1 and thus the aerosol production may be continued. If the expected two consecutive quantitative or qualitative changes of the observed physical quantity are not detected, the inserted aerosol-forming substrate 1 may be identified as non-original and the inductive heating thereof may be stopped. In a variant of the shown embodiment of the aerosol-forming substrate 1 the second Curie-temperature of the second susceptor material 12 may be at least 20° C. lower than the third Curie-temperature of the third susceptor material 13. This difference in Curie-temperatures of the second and third susceptor materials 12, 13 may facilitate the detection of changes of the magnetic properties of the second and third susceptor materials 12, 13, respectively, when they reach their respective second and third Curie-temperatures. As shown in FIG. 3 the first susceptor material 11 may be distributed throughout the solid material 10 about homogeneously. The second and third susceptor materials 12, 13 may preferably be arranged in peripheral regions of the aerosol-forming substrate 1.

Figure 4:
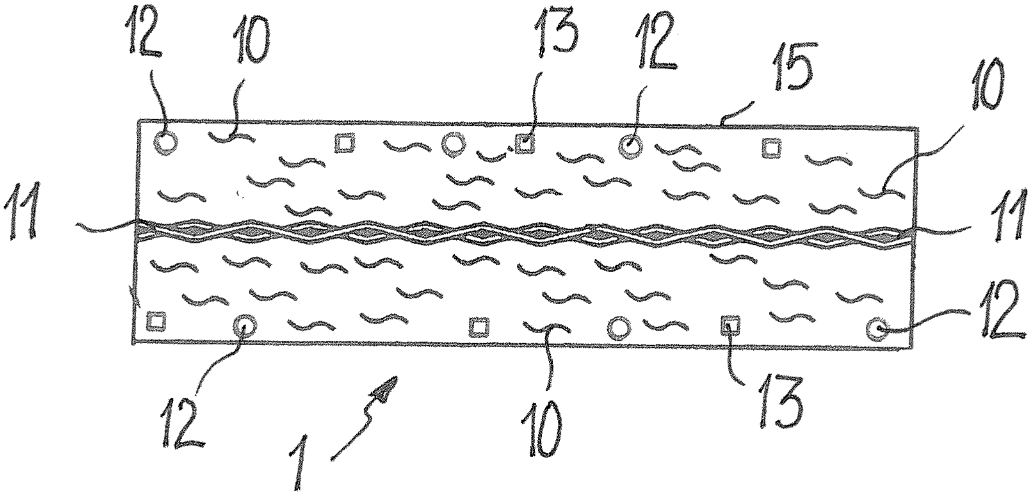
FIG. 4 shows a third embodiment of the aerosol-forming substrate comprising a first susceptor material of filament configuration and second and third susceptor materials of particulate configuration.

In FIG. 4 a further embodiment of an aerosol-forming substrate is shown, which again is generally designated with reference numeral 1. The aerosol-forming substrate 1 may be of a generally cylindrical shape and may be enclosed by a tubular casing 15, such as, e.g., an overwrap. The aerosol-forming substrate 1 comprises a solid material 10 which is capable of releasing volatile compounds that can form an aerosol upon heating of the aerosol-forming substrate 1 and at least first, second and third susceptor materials 11, 12, 13. The first susceptor material 11 may be of a filament configuration. The first susceptor material of filament configuration may have different lengths and diameters and may be distributed throughout the solid material. As exemplarily shown in FIG. 4 the first susceptor material 11 of filament configuration may be of a wire-like shape and may extend about axially through a longitudinal extension of the aerosol-forming substrate 1. The second and third susceptor materials 12, 13 may be of particulate configuration. They may preferably be arranged in peripheral regions of the aerosol-forming substrate 1. If deemed necessary, the second and third susceptor materials 12, 13 may be distributed throughout the solid material with local concentration peaks.

Figure 5:
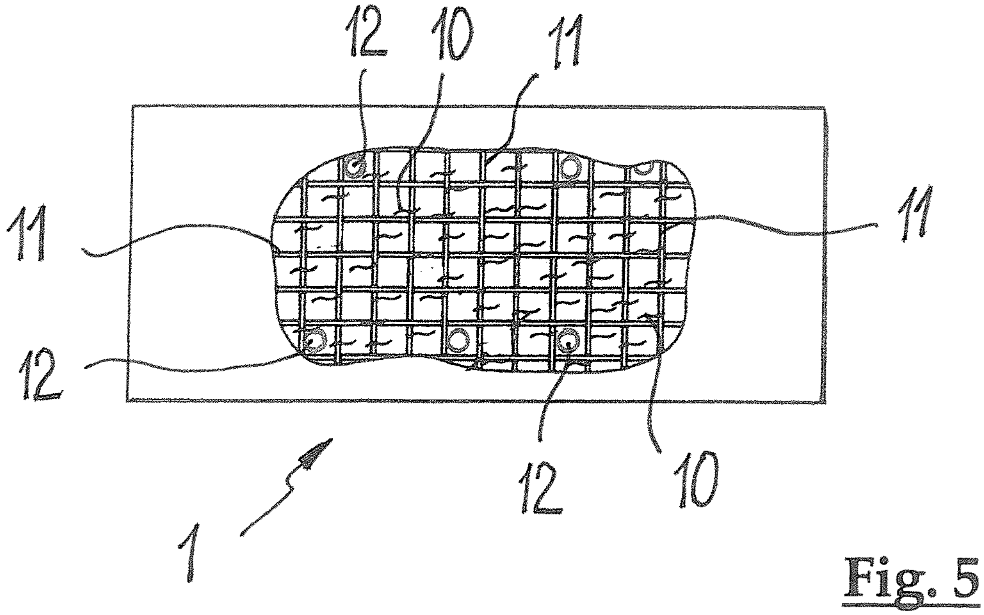
FIG. 5 shows another embodiment of the aerosol-forming substrate comprising a first susceptor material of mesh-like configuration and a second susceptor material of particulate configuration.

In FIG. 5 yet another exemplary embodiment of an aerosol-forming substrate is shown, which again is generally designated with reference numeral 1. The aerosol-forming substrate 1 may again be of a generally cylindrical shape and may be enclosed by a tubular casing 15, such as, e.g., an overwrap. The aerosol-forming substrate comprises solid material 10 which is capable of releasing volatile compounds that can form an aerosol upon heating of the aerosol-forming substrate 1 and at least first and second susceptor materials 11, 12. The first susceptor material 11 may be of a mesh-like configuration which may be arranged inside of the aerosol-forming substrate 1 or, alternatively, may at least partially form an encasement for the solid material 10. The term "mesh-like configuration" includes layers having discontinuities therethrough. For example the layer may be a screen, a mesh, a grating or a perforated foil. The second susceptor material 12 may be of particulate configuration and may preferably be arranged in peripheral regions of the aerosol-forming substrate.

In the described embodiments of an aerosol-forming substrate 1 the second and optionally third susceptor materials 12, 13 have been described as being of particulate configuration. It should be noted that they also might be of filament configuration. Alternatively, at least one of the second and third susceptor materials 12, 13 may be of particulate configuration, while the other one may be of filament configuration. The susceptor material of filament configuration may have different lengths and diameters. The susceptor material of particulate configuration may preferably have an equivalent spherical diameter of 10 μm-100 μm.

As it has been mentioned before, the inductive heating device 2 may be provided with an indicator, which may be activatable upon detection of the second and optionally the third susceptor materials 12, 13 having reached their second and third Curie-temperatures. The indicator may e.g. be an acoustical or an optical indicator. In one embodiment of the aerosol-delivery system the optical indicator may be a LED, which may be provided on the tubular housing 20 of the induction heating device 2. Thus, if a non-original aerosol-forming substrate is detected, e.g. a red light may indicate the non-original product.

While different embodiments of the invention have been described with reference to the accompanying drawings, the invention is not limited to these embodiments. Various changes and modifications are conceivable without departing from the overall teaching of the present invention. Therefore, the scope of protection is defined by the appended claims.

The invention claimed is:

1. An aerosol-forming substrate for use in combination with an inductive heating device for identification of the aerosol-forming substrate in the device, the aerosol-forming substrate comprising:

a solid material capable of releasing volatile compounds that can form an aerosol upon heating of the aerosol-forming substrate, at least a first susceptor material for heating the aerosol-forming substrate to a predefined maximum heating temperature, the first susceptor material being arranged in thermal proximity of the solid material, at least a second susceptor material as a substrate identifier having a second Curie-temperature which is lower than the predefined maximum heating temperature of the first susceptor material, and wherein the first and the second susceptor materials are of particulate configuration, and wherein the second susceptor material has a concentration by weight which is lower than a concentration by weight of the first susceptor material.

2. The aerosol-forming substrate of claim 1, wherein the at least a first susceptor material is arranged homogeneously throughout the aerosol-forming substrate.

3. The aerosol-forming substrate of claim 1, wherein the at least a second susceptor material is arranged in peripheral regions of the aerosol-forming substrate.

4. The aerosol-forming substrate of claim 1, wherein the second susceptor material provides consecutive physical quantities related to the second Curie-temperature, which consecutive physical quantities are specific for the aerosol-forming substrate for identifying the aerosol-forming substrate.

5. The aerosol-forming substrate according to claim 1, wherein the second Curie-temperature of the second susceptor material amounts to 15%-40% of a maximum heating temperature of the first susceptor material.

6. The aerosol-forming substrate according to claim 1, wherein a maximum heating temperature of the first susceptor material is selected such, that upon being inductively heated an overall average temperature of the aerosol-forming substrate does not exceed 240° C.

7. The aerosol-forming substrate according to claim 1, wherein a maximum heating temperature of the first susceptor material does not exceed 370° C.

8. The aerosol-forming substrate of claim 1, further comprising at least a third susceptor material as a substrate identifier having a third Curie-temperature which is lower than the predefined maximum heating temperature of the first susceptor material and the at least a third susceptor material being arranged in peripheral regions of the aerosol-forming substrate.

9. The aerosol-forming substrate of claim 8, wherein the at least a third susceptor material is one of particulate, or filament, or mesh-like configuration.

10. The aerosol-forming substrate of claim 1, further comprising at least a third susceptor material as a substrate identifier having a third Curie-temperature, the third Curie-temperature of the third susceptor material and the second Curie-temperature of the second susceptor material being distinct from one another and lower than the predefined maximum heating temperature of the first susceptor material.

11. The aerosol-forming substrate according to claim 1, wherein the aerosol-forming substrate is attached to a mouthpiece.

12. The aerosol-forming substrate according to claim 1, wherein the aerosol-forming substrate is attached to a mouthpiece, which comprises a filter plug.

13. The aerosol-forming substrate according to claim 1, wherein the aerosol-forming substrate is enclosed by a tubular casing.

14. The aerosol-forming substrate according to claim 1, wherein the at least a first and a second susceptor materials in particulate configuration have an equivalent spherical diameter of 10 μm to 100 μm.

15. An aerosol-delivery system comprising an inductive heating device and an aerosol-forming substrate, the aerosol-delivery system for identification of the aerosol-forming substrate when the aerosol-forming substrate is accommodated in the inductive heating device, wherein the aerosol-forming substrate comprises:

a solid material capable of releasing volatile compounds that can form an aerosol upon heating of the aerosol-forming substrate;

a least a first susceptor material for heating the aerosol-forming substrate to a predefined maximum heating temperature, the first susceptor material being arranged in thermal proximity of the solid material;

at least a second susceptor material as a substrate identifier having a second Curie-temperature which is lower than the predefined maximum heating temperature of the first susceptor material;

wherein the first and the second susceptor materials are of particulate configuration, and wherein the second susceptor material has a concentration by weight which is lower than a concentration by weight of the first susceptor material.

16. The aerosol-delivery system according to claim 15, wherein the inductive heating device further comprises an electronic control circuitry, which is adapted for a detection of the second susceptor material having reached its second Curie-temperature, which detection is used for identifying the aerosol-forming substrate.

17. The aerosol-delivery system according to claim 15, wherein the inductive heating device further comprises an indicator, which is activatable upon detection of the second susceptor material having reached its second Curie-temperature, wherein the indicator is indicative of an aerosol-forming substrate matching or non-matching the inductive heating device the aerosol-forming substrate is used with.

18. The aerosol-delivery system according to claim 17, wherein the indicator is an optical indicator, which is provided on a housing of the inductive heating device.

19. The aerosol-delivery system according to claim 16, wherein the electronic control circuitry is adapted to detect a time slot between activating the inductive heating device and the detection of the second susceptor material having reached its second Curie-temperature, the time slot identifying the aerosol-forming substrate used in the aerosol-delivery system.

* * * * *